United States Patent [19]

Döhring

[11] Patent Number: 5,487,366
[45] Date of Patent: Jan. 30, 1996

[54] INTAKE MANIFOLD

[75] Inventor: Klaus Döhring, München, Germany

[73] Assignee: Firma Carl Freudenberg, Weinheim, Germany

[21] Appl. No.: 225,198

[22] Filed: Apr. 8, 1994

[30] Foreign Application Priority Data

Apr. 8, 1993 [DE] Germany ............ 43 11 744.9

[51] Int. Cl.⁶ .................... F02B 27/02; F02M 35/10
[52] U.S. Cl. .................... 123/336; 123/184.54; 123/587
[58] Field of Search ................ 123/184.54, 336, 123/337, 587

[56] References Cited

U.S. PATENT DOCUMENTS

| 4,779,580 | 10/1988 | Rutschmann | 123/336 X |
| 5,179,917 | 1/1993 | Hokazono et al. | 123/336 X |
| 5,255,648 | 10/1993 | Hokazono et al. | 123/308 |

Primary Examiner—Tony M. Argenbright
Attorney, Agent, or Firm—Kenyon & Kenyon

[57] ABSTRACT

An intake manifold for use with a combustion engine is disclosed. The intake manifold comprises a dimensionally stable induction pipe body having at least one first flow-through opening and at least one first adjusting element arranged in the first flow-through opening to vary the available cross-sectional area of the passage. This adjusting element takes the form of a throttle valve, which is rotatably supported in the induction pipe body and which is capable of being forced to engage sealingly with the boundary wall of the first flow-through opening. In the area of the throttle valve, the induction pipe body has at least one second flow-through opening, which is allocated as a by-pass so as to be adjacent to the first flow-through opening, said second flow-through opening being capable of being sealed by at least one second adjusting element, which is comprised of a one-way valve that is only able to be forced into an open position in the direction of the attached combustion engine.

18 Claims, 4 Drawing Sheets

INTAKE MANIFOLD

BACKGROUND OF THE INVENTION

The invention relates generally to an intake manifold for a combustion engine of the type comprising a dimensionally stable induction pipe body having at least one flow-through opening and at least one first adjusting element being arranged in the first flow-through opening to vary the cross-sectional area through which an air/fuel mixture can pass. This adjusting element typically is a throttle valve, which is rotatably supported in the induction pipe body and which is capable of being urged to sealingly engage with the boundary wall of the first flow-through opening.

Such types of intake manifolds are generally known. However, in many of the known intake manifolds, the engine output of the combustion engine is diminished by a return flow of air-fuel mixture from the combustion chamber back into the intake manifold. Because of piston travel and valve overlap, such a return flow in the intake manifold occurs with greater intensity in the low speed range, when the force of the gas flow is relatively small.

There remains a need for the further development of an intake manifold in which the air-fuel mixture is prevented from flowing back into the intake manifold of the combustion engine, and in which resistance to flow in the direction of the combustion engine is not significantly increased by the intake manifold at high engine speeds.

SUMMARY OF THE INVENTION

According to the present invention, an induction pipe body is provided with at least a second flow-through opening in the area of the throttle valve. This second flow-through opening is allocated as a by-pass so as to be adjacent to the first (i.e., throttle) flow-through opening, and can be sealed by at least a corresponding second adjusting element. This second adjusting element comprises a one-way valve that can be forced into an open position in the direction of the combustion engine to which it is attached. During high engine speeds when the combustion chambers of the combustion engine must be filled to the best possible extent with an air-fuel mixture, the advantage of this refinement is that the throttling effect of the one-way valve inside the second flow-through opening can be completely circumvented by fully opening the throttle valve. This has the effect that the one-way valve of the second flow-through opening is not traversed by the air/fuel mixture because of its comparatively greater resistance to fluid flow. On the other hand, when the flow velocity of the gas through the intake manifold is low, the air-gas mixture is prevented from flowing back out of the combustion chambers of the combustion engine, because the throttle valve seals the first flow-through opening and because the unburned gas is supplied to the combustion chambers through the one-way valve and the second flow-through opening.

In accordance with one advantageous refinement, the one-way valve of the second flow through opening can be of the flutter valve type, which can be actuated by differential pressure. Flutter valves, which are designed to operate as non-return check valves, have a construction that is simple and also entails few parts. They also reliably provide good working properties over a long service life, while minimizing maintenance costs.

The second flow-through opening can surround the first flow-through opening on the outside, the flutter valve comprising a ring-shaped cage made of dimensionally stable material, which is fixed relatively immovably in the induction manifold body and forms the second flow-through opening, the inner peripheral area of the cage being capable of being forcibly and sealingly engaged with the throttle valve. The flutter valve is provided with a number of sealing members corresponding to the number of perforations in the cage, each of the perforations being developed as a valve seat and capable of being urged to sealingly engage the tongue-shaped sealing members. Relative to their size, these types of flutter valves have a large cross-sectional area of passage, the circular sealing members arranged around the throttle valve substantially preventing turbulence from arising in the contiguous induction manifold body. To keep the loss of air-fuel mixture from the combustion chambers of the combustion engine as low as possible, it is beneficial to arrange the flutter valve as closely as possible to the intake valve of the combustion engine, i.e., as closely as possible to or even within the cylinder head.

The sealing members can be made of a polymer material. Thus, secondary sealing elements, which would otherwise be used to seal off the sealing member and the sealing seat from one another in the closed position of the flutter valve, can be dispensed with. The minimal numbers of parts required for the construction of the flutter valve is quite advantageous from a standpoint of economics and production engineering.

It has proven to be advantageous to provide several—preferably three to eight—sealing members uniformly distributed in the circumferential direction. This construction helps to keep the resistance to flow across the one-way valve as low as possible, even given low combustion engine speeds, until the throttle valve is opened, so to allow the greatest possible volumetric flow of air-fuel mixture to be supplied to the combustion engine in this operating state of the combustion engine.

The sealing members, which are adjacent to one another in the circumferential direction, can have a spring stiffness that deviates one from the other. To that end, the sealing members can consist of the same material but have different wall thicknesses or, given the same wall thickness, consist of different material. In this case, it is advantageous that the natural frequency of the sealing members deviates one from the other as a result of this refinement, and the different excitation frequencies reduce the noise emission from the valve caused by actuation.

BRIEF DESCRIPTION OF THE DRAWINGS

Other characteristics of the invention appear from the following detailed description and from the accompanying drawings, in which.

DETAILED DESCRIPTION

Figure 1:
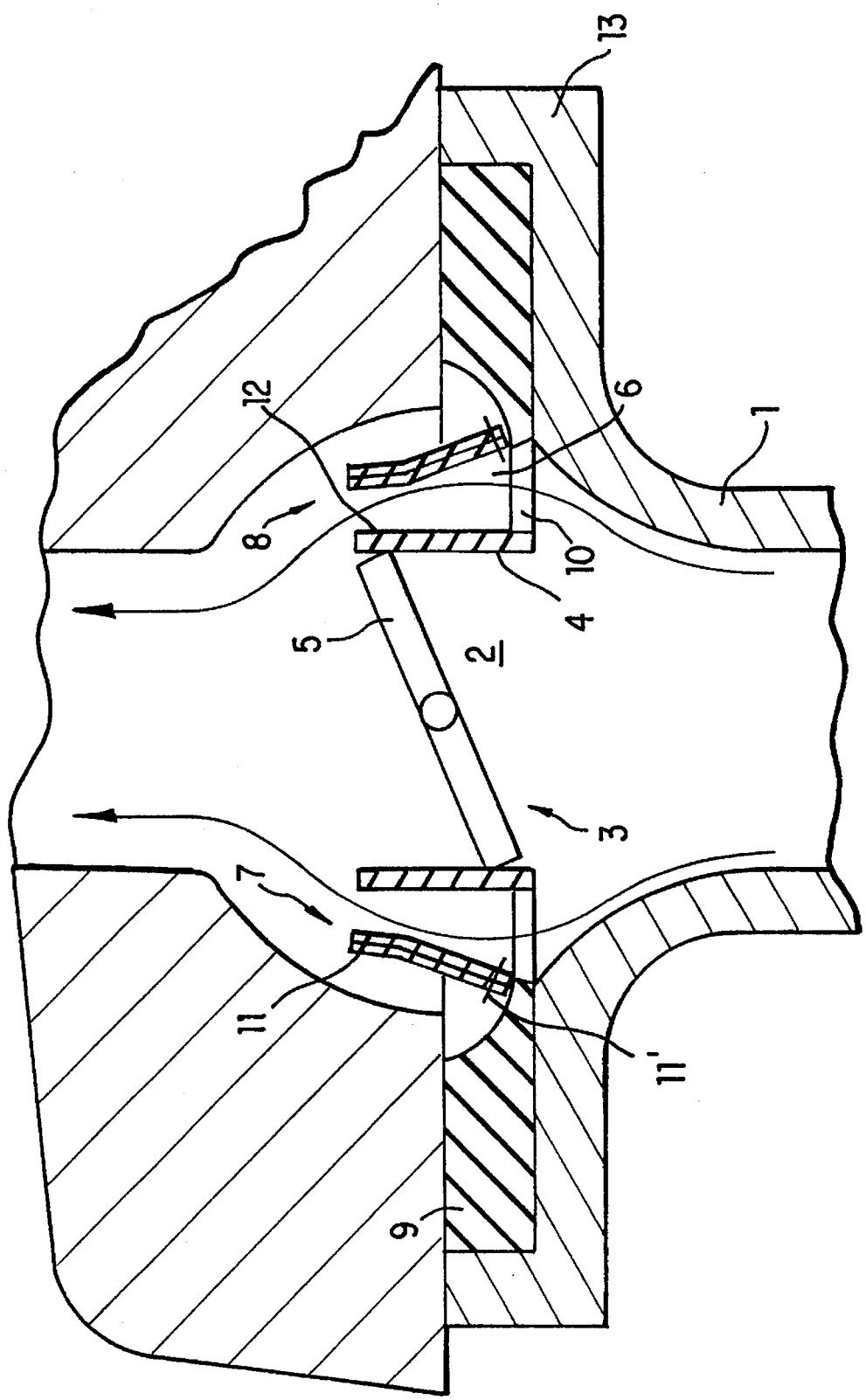
FIG. 1 is a longitudinally sectional view of a first embodiment of an intake manifold constructed according to the principles of the invention.
Figure 2:
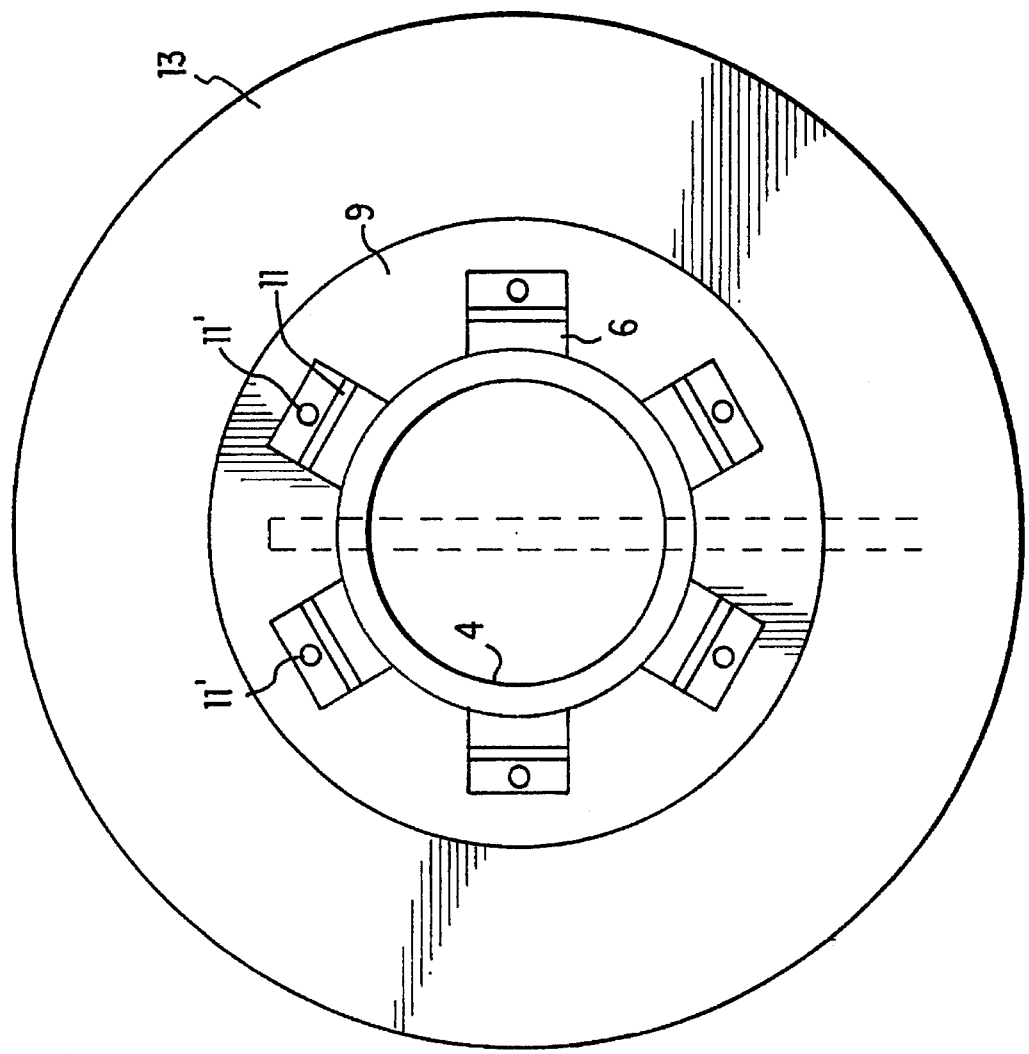
FIG. 2 depicts the intake manifold of FIG. 1 as viewed from the combustion engine.

FIGS. 1 and 2 show an intake manifold for a combustion engine, the induction pipe body 1 being constructed of polymer material and having first and second flow-through openings 2 and 6, which are each provided with adjusting elements 3 and 7, respectively, to alter an associated cross-sectional area of passage. The first adjusting element 3 is a throttle valve 5, which is secured to a throttle shaft and is supported by this shaft in the intake manifold. The second flow-through opening 6 is formed by a cage 9 of a one-way valve 8, which as a non-return valve can only be traversed by flow in the direction of the combustion engine. The second flow-through openings 6 are formed as perforations 10 in the cage 9, the perforations 10 being designed to serve as a valve seat 12 that can be forcibly engaged with the elastomeric sealing members 11.

In FIG. 1, the intake manifold is flange-mounted directly on the cylinder head in the immediate vicinity of the intake valve of the combustion engine. The one-way valve 8 is secured to the front side of the induction pipe body 1 facing the combustion engine, the cage 9 with its inner circumference forming the boundary wall 4 of the first flow-through opening 2. The throttle valve is rotatably supported inside the induction pipe body 1. The sealing members 11 of the one-way valve 8, which in this exemplary embodiment are made of an elastomeric material, are each secured to the cage 9 in a gas-tight manner by a fastening element 11'.

The second adjusting element 7 of FIG. 1 is further shown in FIG. 2. This illustrative embodiment provides for six second flow-through openings 6, which are distributed uniformly in the circumferential direction. In this embodiment, the combustion engine (not shown here) is operated in the low speed range, so that the air or the air-fuel mixture only flows through the second adjusting elements 7 and is fed to the combustion chambers. To prevent the mixture from flowing back as a result of the oscillating travel of the piston and the valve overlap of the combustion engine, the sealing members 11 are designed so that they can be forced automatically into the closed position, given a relative overpressure on the side facing the combustion engine.

Figure 3:
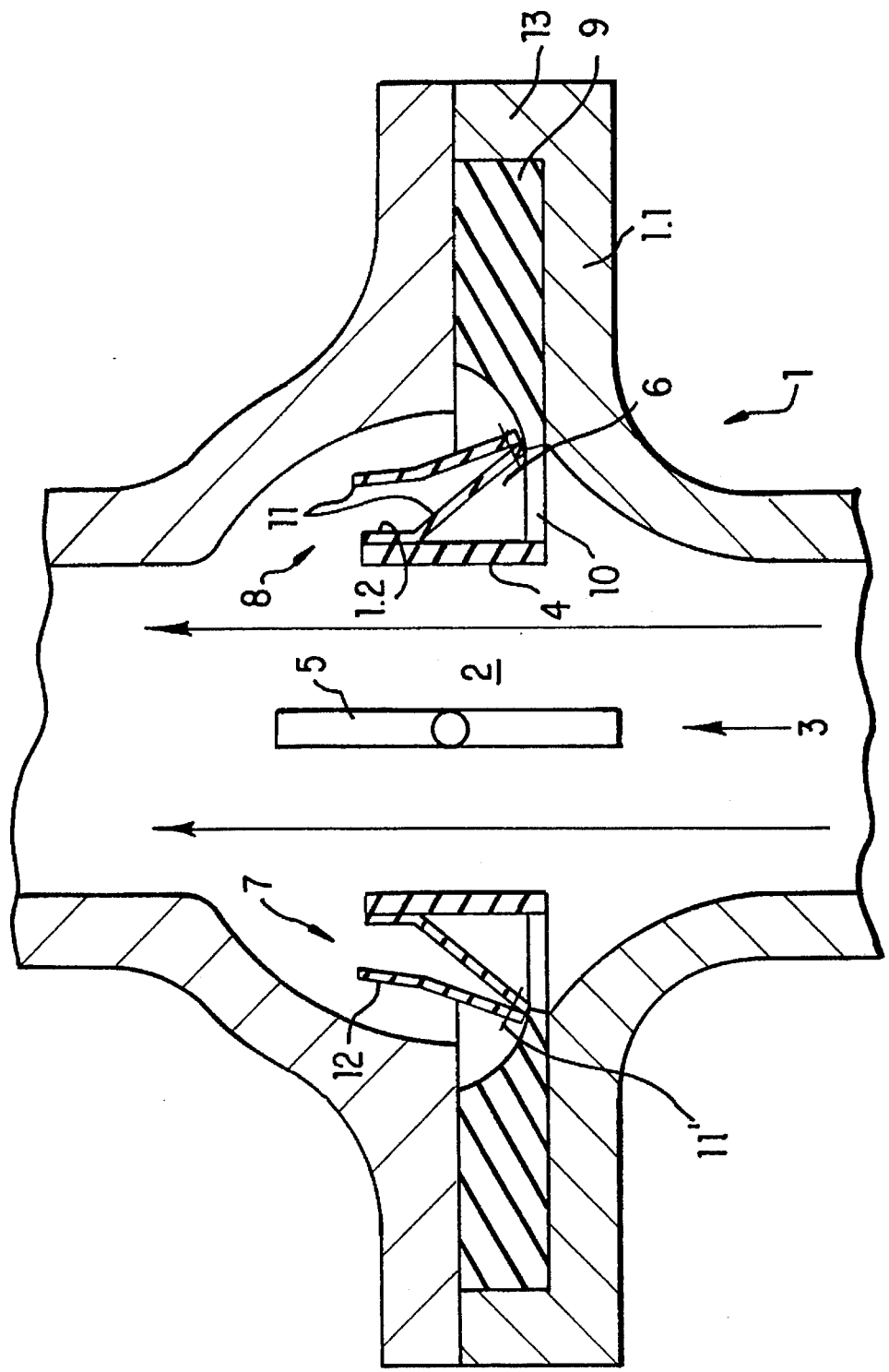
FIGS. 3 and 4 illustrate a second embodiment, in which the intake manifold has a multipart design.
Figure 4:
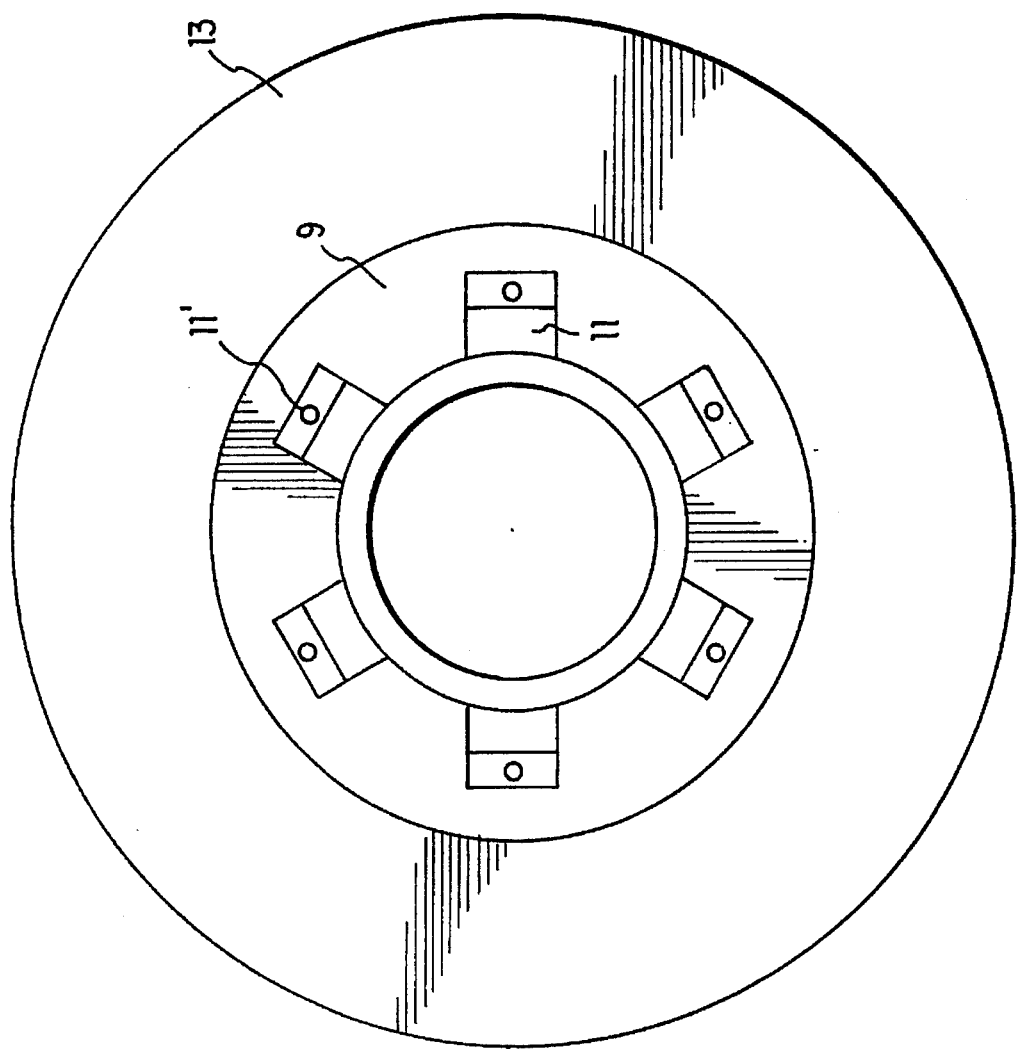

FIG. 3 depicts a second embodiment, which has an intake manifold similar to that of the embodiment of FIG. 1. Deviating from the exemplified embodiment of FIG. 1, the intake manifold of FIG. 3 has a multipart design, the second adjusting element 7 being arranged between two axially adjacent parts 1.1 and 1.2 of the induction pipe body 1.

In this exemplary embodiment, the combustion engine (not shown) is operated at high speed in the full-load state. To keep the flow losses to a minimum in this operating state, the throttle valve 5 in the first flow-through opening 2 is completely open. The second flow-through opening 6 is sealed by the sealing members 11, which engage with the valve seats 1.2.

To assure the exact positioning of the second adjusting element 7 relative to the throttle valve 5, which is arranged inside the induction pipe body 1, the induction pipe body 1 is provided with a spigot 13, inside of which the cage 9 is accommodated. Moreover, it is advantageous that the cage 9 and the induction pipe body 1 form one unit that can be preassembled, as this arrangement offers significant advantages with regard to assembly engineering and with respect to minimizing assembly errors.

What is claimed is:

1. An intake manifold for use with a combustion engine, comprising:

a dimensionally stable induction pipe body having at least one first flow-through opening, the flow through opening defining a passage and further having a boundary wall;

at least one first adjusting element arranged in the first flow-through opening to vary the cross-sectional area of the passage of the first flow-through opening, the adjusting element comprising a throttle valve that is rotatably supported in the induction pipe body and which is capable of being urged to sealingly contact the boundary wall of the first flow-through opening;

at least one second flow-through opening in the area immediately laterally adjacent the throttle valve within the induction pipe body, the second flow-through openings serving as a by-pass so as to be immediately laterally adjacent to the first flow-through opening in the area of the throttle valve; and at least one adjusting element assigned to the second flow-through opening for sealing same, said adjusting element comprising a one-way valve that can be forced into an open position only by a fluid flow directed towards the associated combustion engine.

2. The intake manifold according to claim 1, wherein the one-way valve comprises a flutter valve that is capable of being actuated by differential pressure.

3. The intake manifold according to claim 2, wherein the second flow-through opening surrounds the first flow-through opening on its exterior;

the flutter valve comprises a ring-shaped cage made of dimensionally stable material that has a number of perforations and is fixed relatively immovably in the induction manifold body and forms the second flow-through opening;

the throttle valve can be sealingly engaged with the inner peripheral area of the cage; and the flutter valve has a number of tongue-shaped sealing members corresponding to the number of perforations in the cage, each of which said perforations is developed as a valve seat and is able to be forced to engage sealingly with the tongue-shaped sealing members.

4. The intake manifold according to claim 3, wherein the sealing member is made of a polymer material.

5. The intake manifold according to claim 3, wherein two to eight sealing members are uniformly distributed in the circumferential direction.

6. The intake manifold according to claim 4, wherein two to eight sealing members are uniformly distributed in the circumferential direction.

7. The intake manifold according to claim 4, wherein three to eight sealing members are uniformly distributed in the circumferential direction.

8. The intake manifold according to claim 4, wherein the sealing members are adjacent to one another in the circumferential direction and have a spring stiffness that deviates from one another.

9. The intake manifold according to claim 7, wherein the sealing members are adjacent to one another in the circumferential direction and have a spring stiffness that deviates from one another.

10. An intake manifold for use with a combustion engine, comprising:

a dimensionally stable induction pipe body having at least one first flow-through opening, the flow through opening defining a passage and further having a boundary wall;

at least one first adjusting element arranged in the first flow-through opening to vary the cross-sectional area of the passage of the first flow-through opening, the adjusting element comprising a throttle valve that is rotatably supported in the induction pipe body and which is capable of being urged to sealingly contact the boundary wall of the first flow-through opening;

at least two, second flow-through openings in the area of the throttle valve within the induction pipe body, the second flow-through openings serving as a by-pass so as to be adjacent to the first flow-through opening in the area of the throttle valve; and at least one adjusting element assigned to each of the second flow-through openings for sealing same, said adjusting element comprising a one-way valve that can be forced into an open position only by a fluid flow directed towards the associated combustion engine, wherein each adjusting element provides a closing force that varies between the adjusting elements.

11. The intake manifold according to claim 10, wherein the one-way valve comprises a flutter valve that is capable of being actuated by differential pressure.

12. The intake manifold according to claim 11, wherein
the second flow-through opening surrounds the first flow-through opening on its exterior;

the flutter valve comprises a ring-shaped cage made of dimensionally stable material that has a number of perforations and is fixed relatively immovably in the induction manifold body and forms the second flow-through opening;

the throttle valve can be sealingly engaged with the inner peripheral area of the cage; and the flutter valve has a number of tongue-shaped sealing members corresponding to the number of perforations in the cage, each of which said perforations is developed as a valve seat and is able to be forced to engage sealingly with the tongue-shaped sealing members.

13. The intake manifold according to claim 12, wherein the sealing member is made of a polymer material.

14. The intake manifold according to claim 12, wherein two to eight sealing members are uniformly distributed in the circumferential direction.

15. The intake manifold according to claim 13, wherein two to eight sealing members are uniformly distributed in the circumferential direction.

16. The intake manifold according to claim 13, wherein three to eight sealing members are uniformly distributed in the circumferential direction.

17. The intake manifold according to claim 13, wherein the sealing members are adjacent to one another in the circumferential direction and have a spring stiffness that deviates from one another.

18. The intake manifold according to claim 16, wherein the sealing members are adjacent to one another in the circumferential direction and have a spring stiffness that deviates from one another.

* * * * *